United States Patent
Nishikigi

[11] Patent Number: 5,951,322
[45] Date of Patent: Sep. 14, 1999

[54] FLAT CABLE CONNECTING STRUCTURE WITH STRAIN RELIEF

[75] Inventor: Kenichiro Nishikigi, Miyagi-ken, Japan

[73] Assignee: Alps Electric Co., Ltd., Tokyo, Japan

[21] Appl. No.: 08/968,661

[22] Filed: Nov. 12, 1997

[30] Foreign Application Priority Data

Nov. 13, 1996 [JP] Japan .................................. 8-318690

[51] Int. Cl.⁶ .................................................. H01R 13/58
[52] U.S. Cl. ........................................... 439/456; 439/492
[58] Field of Search ............................ 439/164, 67, 493, 439/456, 449, 470, 492

[56] References Cited

U.S. PATENT DOCUMENTS

| | | | |
|---|---|---|---|
| 5,226,831 | 7/1993 | Horiuchi | 439/164 |
| 5,230,713 | 7/1993 | Schauer | 29/856 |
| 5,651,686 | 7/1997 | Okuhara | 439/164 |
| 5,683,259 | 11/1997 | Sato | 439/164 |
| 5,762,507 | 6/1998 | Mochizuki et al. | 439/164 |
| 5,770,818 | 6/1998 | Tanaka et al. | 439/164 X |

*Primary Examiner*—Edgar Burr
*Assistant Examiner*—Minh H. Chall
*Attorney, Agent, or Firm*—Brinks Hofer Gilson & Lione

[57] ABSTRACT

A flat cable connecting structure including a flat cable having a film, a connecting portion, and securing portions; and an external connecting part having a body, a connecting terminal, and engaging portions. The connecting terminal is connected to the connecting portion at a conductor portion, and the engaging portions are made to engage the securing portions, in order to connect the external connecting part to the flat cable 10. The flat cable further includes a bent portion formed so as to be disposed between the connecting portion and the engaging portions. The flat cable connecting structure further includes a strain relief portion disposed between the connecting portion and the engaging portions. The flat cable connecting structure of the invention overcomes a problem in conventional flat cable connecting structures. In the conventional connecting structures, when a pulling force, with a torque greater than a predetermined value, is exerted on the connecting portion at a conductor portion of a flat cable and a connecting terminal of an external connecting part even once, the reliability with which the flat cable and the external connecting part are connected together at the connecting portion is reduced. Therefore, those products found to have unsuitable rotation ranges, during shipment inspection, are thrown away, instead of being adjusted.

9 Claims, 5 Drawing Sheets

FLAT CABLE CONNECTING STRUCTURE WITH STRAIN RELIEF

BACKGROUND OF THE INVENTION

1. Field of the Invention

The present invention relates to a flat cable connecting structure, incorporated in a vehicle steering apparatus, for allowing electrical connection between a handle at a rotor side and a stator side.

2. Description of the Related Art

FIG. 8 is an exploded perspective view of a rotary connector. Such a rotary connector A generally comprises a set consisting of a upper cover 20 and a lower cover 21, linked concentrically so as to be rotatable relative to each other, a cable accommodating portion 22, and a flat cable 23 accommodated and wound in a space between the upper cover 20 and the cable accommodating portion 22 and the lower cover 21. Both ends of the flat cable 23 are electrically led out indirectly through an inwardly-bent lead block 24 and an outwardly-bent lead block 25 externally of the cable accommodating portion 22. Here, the inwardly-bent lead block 24 engages the outer edge of the upper cover 20, while the outwardly-bent lead block 25 engages the outer edge of the lower cover 21. In this case, since the upper and lower covers 20 and 21 have a circular outside shape, the inwardly-bent and outwardly-bent lead blocks 24 and 25 are formed into a shape which corresponds to this circular outside shape, so that they have either a recessed or protruding surface.

The upper cover 20 is formed as a movable element side housing, whereas a unit in which the lower cover 21 is integrally formed with the cable accommodating portion 22 is formed as a stationary element side housing. Clockwise or counterclockwise rotation of the movable element side housing causes the flat cable 23 to either wind or rewind in a space.

The rotary connector A generally having the above-described construction is used as an electrical connecting means to a vehicle air bag system, a horn circuit, or the like. In such a case, the stationary element side housing, composed of the lower cover 21 and the cable accommodating portion 22, is secured to a steering column of a steering device, the movable element side housing composed of the upper cover 20 is secured to the handle, and the two ends of the flat cable 23 are connected to the electrical parts at the steering column side and the handle side. Here, a known connecting structure for electrically leading out the flat cable is used. In the structure, conductor portions 23a and 23b at both ends of the flat cable 23 are connected to a connector 26 of another party, which is an electrical part disposed externally of the housings, through terminals 24a and 25a of the inwardly-bent lead block 24 and the outwardly-bent lead block 25, respectively, serving as external connecting parts.

A description will now be given of a conventional connecting structure, with reference to specific drawings. FIG. 5 is a perspective view showing a conventional connecting portion of a flat cable and an outwardly-bent lead block. FIG. 7 is a plan view of a conventional flat cable.

Referring to FIG. 5, the outwardly-bent lead block 1 is composed of a plurality of metal plates insert molded to a resinous molded part 2. One end of each metal plate protrudes from a side face of the resinous molded part 2, forming terminals 3, while the other ends of the metal plates are arranged in a substantially rectangular-shaped window 2a formed at about the center portion of the resinous molded part 2. These other ends of the metal plates form connecting terminals 4. In the conventional structure, six terminals 3 are used, four of which are disposed at the left side face of the resinous molded part 2 at equal intervals, and the remaining two being disposed at around the center portion of the side face. A cable holder 2b is provided at one end of the resinous molded part 2 in the longitudinal direction thereof, and is bent at two locations to form a bent surface 2b'. It is bent downwardly at about 45 degrees at one location, and virtually at right angles at the other location.

A pair of L-shaped first protrusions 2c and a pair of L-shaped second protrusions 2d are formed at around the center portion of the upper surface of the resinous molded part 2. The aforementioned window 2a in which the other ends of the metal plates are arranged is disposed between the first protrusions 2c and the second protrusions 2d. Parts of the metal plates exposed to the outside from the window 2a form the connecting terminals 4. Six connecting terminals 4, which is the same number as the number of terminals 3, are used, so as to allow connection in correspondence with the terminals 3 in an electrically conductive manner.

The flat cable 10 of FIG. 7 is composed of a pair of front and back films 11 and 12, and a plurality of conductors 13 embedded between the front and back films 11 and 12. The films 11 and 12 are each composed of a base film made of polyethylene terephthalate (hereinafter referred to as "PET") or the like, and are about 60 μm thick. The conductors 13 are made of copper foil and are about 32 μm thick. In the present embodiment, six conductors 13 are used to match the number of conductors 13 with the number of connecting terminals 4 of the outwardly-bent lead block 1. The arrangement pitch of the six conductors 13 is such as to match the arrangement pitch of the connecting terminals 4. The film 11 does not cover one end of the flat cable 10. The conductor portions 13a of the plurality of conductors 13 held by the back film 12, which is disposed where the front film 11 is not provided, is exposed to the outside. These exposed portions form conductor portions 13a.

In the longitudinal direction of the flat cable 10 from the conductor portions 13a, a pair of substantially square-shaped cutouts 14 that penetrate the side end surfaces of the front and back films 11 and 12 of the flat cable 10 are provided in the vicinity of the exposed conductor portions 13a. The cutouts 14 engage the second protrusions 2d of the outwardly-bent lead block 1 in order to place the flat cable 10 onto the cable holder 2b of the outwardly-bent lead block 1. Here, an end of the flat cable 10 is retained by the first protrusions 2c.

The conductor portions 13a, which are exposed portions at one end of the flat cable 10, oppose the connecting terminals 4 of the outwardly-bent lead block 1.

The conductor portions 13a of the flat cable 10 are connected to the connecting terminals 4 of the outwardly-bent lead block 1, using an ultrasonic welding machine (described later), and a connector 26, or the like, of another party (see FIG. 8) is connected to the terminals 3 of the outwardly-bent lead block 1, whereby the flat cable 10 is electrically led out to the outside.

As shown in FIG. 9, the ultrasonic welding machine comprises, for example, an anvil 30 for placing a work thereon, a horn 31 for ultrasonically vibrating the work in the direction of arrow A, and an air cylinder 32 for driving the horn 31 to apply pressure to the work in the direction of arrow B. A saw-toothed protrusion (not shown) is formed at an end of the horn 31 in correspondence with the pitch of the conductor portions 13a of the flat cable 10 Here, the conductor portions 13a and the connecting terminals 4 are workpieces. In ultrasonically welding the conductor portions 13a and the connecting terminals 4 together, the connecting terminals 4 of the outwardly-bent lead block 1 and the conductor portions 13a of the flat cable 10 are placed upon each other on the anvil 30. Then, as shown in the figure, when the protrusion of the horn 31 is used to ultrasonically vibrate the portion where the connecting terminals 4 and the conductor portions 13a are placed upon each other, while applying pressure thereto, solid-phase connection occurs between the connecting terminals 4 and the conductor portions 13a, whereby the plurality of connecting terminals 4 and the plurality of the conductor portions 13a are connected together at the same time.

FIG. 6 is a perspective view showing a conventional connecting portion of a flat cable and an inwardly-bent lead block. Referring to FIG. 6, the inwardly-bent lead block 5 is composed of a plurality of metal plates insert molded to a resinous molded part 6. The resinous molded part 6 includes a substantially square-shaped holder 6a for placing the flat cable 10 thereon; an inclined portion 6b, with a predetermined inclined surface, which extends from one end of the holder 6a in the longitudinal direction thereof; a terminal lead-out portion 6c extending from the bottom of a side face of the holder 6a; and a lead wire lead-out portion 6d extending at right angles from the lower right end of the terminal lead-out portion 6c.

A substantially rectangular window 6e is provided at the other end of the holder 6a, and a pair of L-shaped protrusions 6f are formed so as to protrude upwardly from the sides of the upper surface of the holder 6a. An end of each metal plate protrudes from a side face of the terminal lead-out portion 6c of the resinous molded part 6, thereby forming terminals 7 and lead wire connecting terminals 6g. The other ends of the metal plates are arranged in the window 6e of the resinous molded part 6, thereby forming connecting terminals 8. The lead wire connecting terminals 6g are formed in the lead wire lead-out portion 6d.

In the present embodiment, six connecting terminals 8 are used to be integrally connected to the four terminals 7 and the two lead wire connecting terminals 6g, respectively. The terminals 7 are connected, for example, to a horn circuit or a cruise control circuit through a connector 26' of the other part, and the lead wire connecting terminals 6g are directly welded or soldered onto lead wires (not shown), for electrical connection to an air bag system control circuit.

As mentioned above, the rotary connector A is constructed such that the movable element side housing formed by the upper cover 20 can rotate 2 to 2.5 times either clockwise or counterclockwise. However, at times, the movable element side housing formed by the upper cover 20 may be incorrectly mounted to the stationary element side housing composed of the lower cover 21 and the cable accommodating portion 22 so that the movable element side housing, for example, can rotate only once in either the clockwise or counterclockwise direction. Such an incorrectly assembled rotary connector A will be detected as a defective product, during inspection of the amount of rotation of the movable element side housing, using, for example, a torque meter, so that it cannot be shipped. Thus, the defective product must be thrown away.

This is because, when inspection of the amount of rotation is performed, and the movable element side housing is rotated to the terminal end upon one rotation, a pulling force, produced by rotation with a rotational torque greater than a predetermined value, is exerted onto the connecting portion of the conductor portions 13a of the flat cable 10 and the connecting terminals 4 of the outwardly-bent lead block 1. The pulling force on the connecting portion, first, acts upon the cutouts 14 of the flat cable 10, which engage the L-shaped second protrusions 2d of the outwardly-bent lead block 1.

The pulling force on the cutouts 14 causes partial deformation of the cutouts 14, or the cutouts 14 to disengage from the second protrusions 2d, and part of the pulling force is exerted onto the connecting portion of the conductor portions 13a and the connecting terminals 4.

The conductor portions 13a, made of thin copper foils as mentioned above, and the connecting terminals 4 are merely ultrasonically welded together at the connecting portion, so that the connecting portion cannot withstand the pulling force.

This may result in peeling of the connecting portion, so that the conductor portions and the connecting terminals are less reliably connected together. If the rotary connector A is constructed such that the movable element side housing is properly mounted to the stationary element side housing, and inspection for the amount of rotation is performed, the movable element side housing will ordinarily not rotate to the terminal end so as to exert a pulling force on the connecting portion. This is because when the movable element side housing of the rotary connector A, which is designed so as to be rotatable within a large enough rotational range of up to 2.5 revolutions either clockwise or counterclockwise, is secured to the handle of a vehicle, which can actually be rotated within a rotational range of up to two revolutions, the inspection results for the rotary connector will show that the inspection range of the rotary connector is up to two revolutions, so that the rotary connector will not rotate 2.5 times to the terminal end. Thus, when the movable element side housing is properly mounted to the stationary element side housing, part of the pulling force will not be applied to the connecting portion, with a rotational torque greater than a predetermined value, during shipment inspection.

When a pulling force is applied to the connecting portion of the conductor portions 13a and the connecting terminals 4 even once, the connecting portion may get peeled, thus reducing the reliability with which the conductor portions 13a and the terminals 4 are connected together. Thus, products, found to have unsuitable rotational ranges, during shipment inspection, had to be thrown away, instead of being adjusted.

SUMMARY OF THE INVENTION

According to an aspect of the invention, there is provided a flat cable connecting structure, comprising: a flat cable including a film, a connecting portion disposed at a conductor portion being an exposed part of a conductor, and a securing portion separated from the connecting portion in the longitudinal direction of the film; and an electrical connecting part including a body, a connecting terminal, and an engager, with the connecting portion and the engager being disposed at the body, wherein the connecting terminal is connected to the connecting portion at the conductor portion, and the engager is made to engage the securing portion, in order to connect the external connecting part to the flat cable; wherein the flat cable further includes a bent portion so as to be disposed between the connecting portion and the engager; and wherein the flat cable connecting structure further comprises a strain relief portion disposed between the connecting portion and the engager.

Although not exclusive, the engager may include an engaging portion disposed near the connecting portion, and an engaging portion disposed far from the connecting portion, and the bent portion of the flat cable and the strain relief portion may be disposed between the engaging portions.

Although not exclusive, the securing portion may be a cutout, and the engager may be a protrusion.

Although not exclusive, the body may have a deformed surface along the longitudinal direction of the flat cable so as to be disposed between the connecting terminal of the external connecting part and the engager.

Although not exclusive, this deformed surface may be formed into a recess in order to place the flat cable along the inner side of the recess, and the bent portion may correspond to a portion of the flat cable placed along the recess, and the strain relief portion may correspond to a space in the recess.

Although not exclusive, in the flat cable connecting structure, wherein the engager includes an engaging portion near the connecting portion and an engaging portion far from the connecting portion, and wherein the bent portion of the flat cable and the strain relief portion are formed so as to be disposed between both of the engaging portions, the securing portion may be a cutout, and the engager may be a protrusion.

Although not exclusive, in the flat cable connecting structure, wherein the engager includes an engaging portion near the connecting portion and an engaging portion far from the connecting portion, and wherein the bent portion of the flat cable and the strain relief portion are formed so as to be disposed between both of the engaging portions, the body may have a deformed surface along the longitudinal direction of the flat cable so as to be disposed between both of the engaging portions.

Although not exclusive, in the flat cable connecting structure, wherein the engager includes an engaging portion near the connecting portion and an engaging portion far from the connecting portion, and wherein the bent portion of the flat cable and the strain relief portion are formed so as to be disposed between both of the engaging portions, this deformed surface may be formed into a recess in order to place the flat cable along the inner side of the recess, and the bent portion may correspond to a portion of the flat cable placed along the recess, and the strain relief portion may correspond to a space in the recess.

According to another aspect of the present invention, there is provided a rotary connector, comprising: a pair of housings which are linked together so as to be rotatable relative to each other; a flat cable accommodated in a space between the housings, both ends of which are secured to the pair of housings; and an external connecting part connected to at least one end of the flat cable; wherein the flat cable includes a film, a connecting portion disposed at a conductor portion being an exposed part of a conductor, and a securing portion separated from the connecting portion in the longitudinal direction of the film; wherein the electrical connecting part includes a body, a connecting terminal, and an engager, with the connecting portion and the engager being disposed at the body, wherein the connecting terminal is connected to the connecting portion at the conductor portion, and the engager is made to engage the securing portion, in order to connect the external connecting part to the flat cable; wherein the flat cable further includes a bent portion so as to be disposed between the connecting portion and the engager; wherein the rotary connector further comprises a strain relief portion disposed between the connecting portion and the engager; and wherein the external connecting part is fixed to the housing in order to be led out externally of the housing.

Although not exclusive, in the rotary connector, the engager may include an engaging portion disposed near the connecting portion, and an engaging portion disposed far from the connecting portion, and the bent portion of the flat cable and the strain relief portion may be disposed between the engaging portions.

DESCRIPTION OF THE PREFERRED EMBODIMENTS

Figure 1:
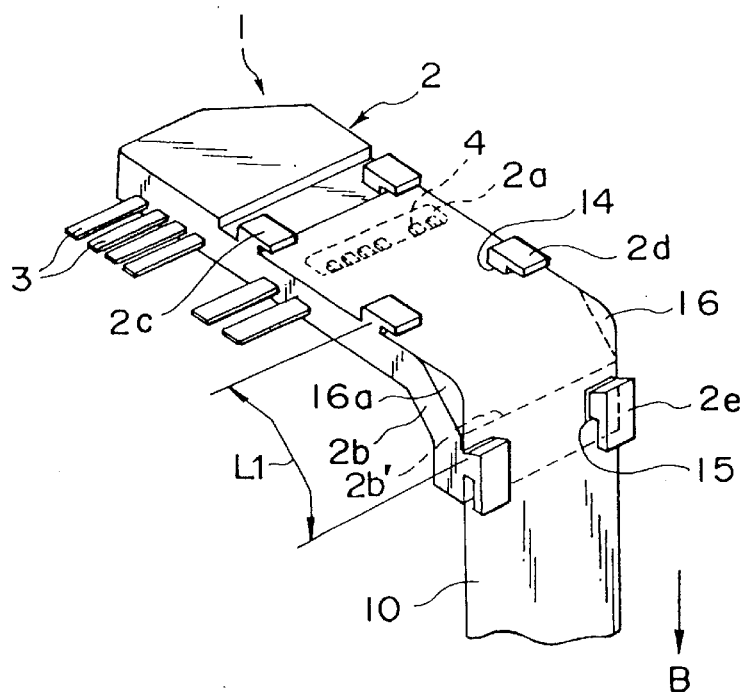
FIG. 1 is a perspective view showing the connecting portion of a flat cable and an outwardly-bent lead block in a first embodiment in accordance with the present invention.
Figure 4:
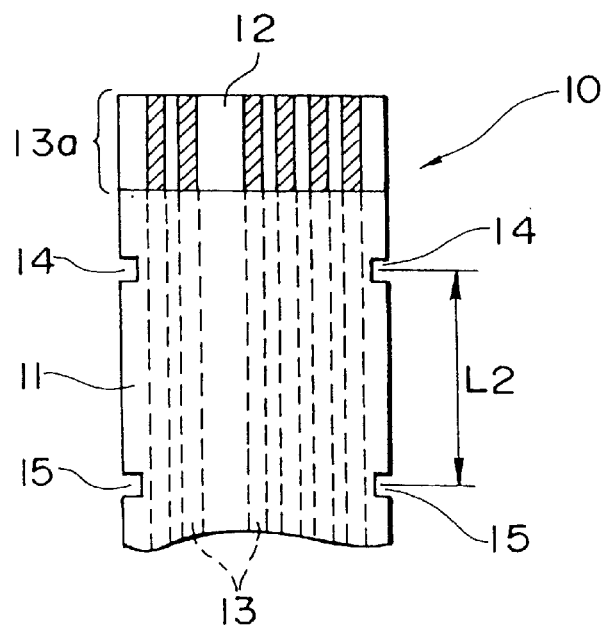
FIG. 4 is a plan view of the flat cable in the first embodiment in accordance with the present invention.
Figure 5:
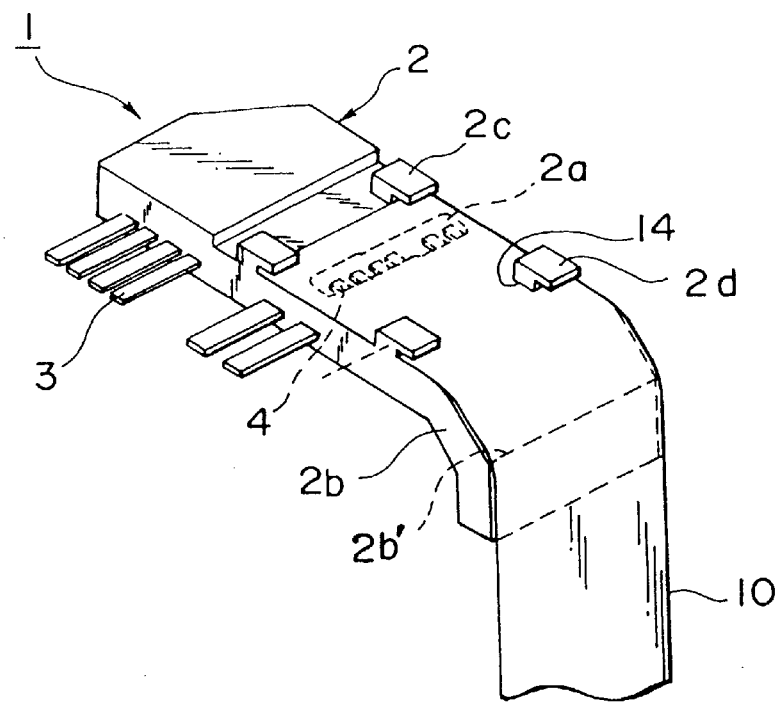
FIG. 5 is a perspective view showing the connecting portion of a flat cable and an outwardly-bent lead block in a conventional first embodiment in accordance with the present invention.
Figure 6:
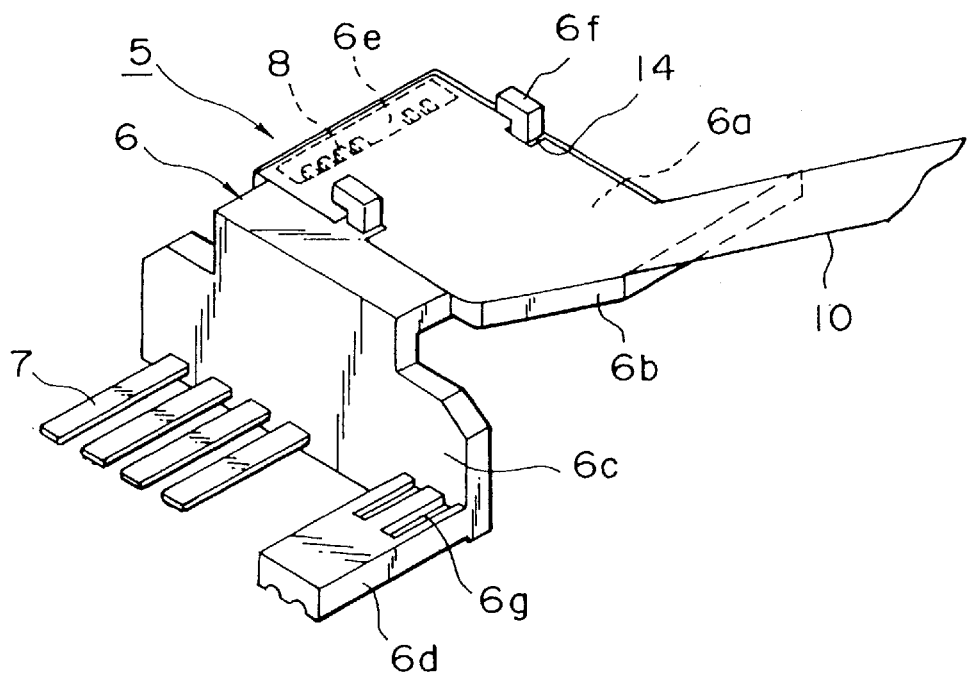
FIG. 6 is a perspective view showing the connecting portion of a flat cable and an inwardly-bent lead block in a conventional second embodiment in accordance with the present invention.
Figure 7:
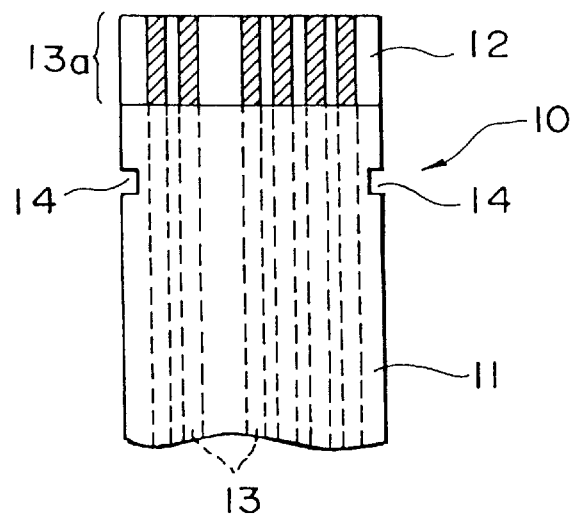
FIG. 7 is a plan view of the conventional flat cable.

A description will now be given of the connecting structure of a first embodiment in accordance with the present invention, with reference to specific drawings. FIG. 1 is a perspective view showing the connecting portion of a flat cable and an outwardly-bent lead block in the first embodiment of the present invention. FIG. 4 is a plan view of the flat cable of the first embodiment in accordance with the present invention. Corresponding parts to those of the conventional structure will be given the same reference numerals.

Referring to FIG. 1, the outwardly-bent lead block 1, serving as an external connecting part, is composed of a plurality of metal plates inserted molded to a resinous molded portion 2, forming the body. An end of each metal plate protrudes from a side face of the resinous molded portion 2, while the other end of each metal plate is arranged in a substantially rectangular window 2a disposed at about the center of the upper surface of the resinous molded portion 2. These other ends of the metal plates form connecting terminals 4. In the first embodiment of the present invention, there are six terminals 3, four of which are disposed at equal intervals along the left side of a side face of the resinous molded portion 2. The remaining two terminals 3 are disposed at about the center portion of the side face. A cable holder 2b, forming a deformed portion, is provided at an end of the resinous molded portion 2 in the longitudinal direction thereof. The cable holder 2b is bent at two locations, forming a bent surface 2b', with the cable holder 2b being bent about 45 degrees at the first location, and being bent virtually at right angles downward at the second location. The cable holder 2b may be bent at angles other than those mentioned above, or may be curved downward.

A pair of L-shaped first protrusions 2c, and a pair of L-shaped second protrusions 2d are formed as engaging portions so as to protrude upward at about the center portion of the upper surface of the resinous molded portion 2. The first protrusions 2c prevent irregular movement of the ends of the flat cable 10. The window 2a, in which the ends of each of the metal plates are arranged, is disposed between the first protrusions 2c and the second protrusions 2d. A pair of L-shaped third protrusions are formed as engaging portions so as to protrude upward at an end of the upper surface of the cable holder 2b. A side surface of each third protrusion 2e is inclined from a line drawn perpendicular to the cable holder 2b, serving as a base, in order to prevent the flat cable 10 from disengaging the third protrusions 2e. The portions of the metal plates, which are exposed to the outside from the window 2a, form connecting terminals 4. Six connecting terminals 4, which is the same number as the number of terminals 3, are used, and are integrally formed with their corresponding terminals 3.

The flat cable 10 of FIG. 4 comprises a plurality of conductors 13 composed of a pair of front and back films 11 and 12, with a plurality of conductors 13 interposed and embedded therebetween. The front and back films 11 and 12 are about 60 μm thick and are insulating base films made of PET or the like. The conductors are made of copper foil, and are about 32 μm thick. In the present embodiment of the invention, six conductors 13 are used so as to match the number of connecting terminals 4 of the outwardly-bent lead block 1. The alignment pitches between the six conductors 13 match the alignment pitches of the connecting terminals 4. One end of the flat cable 10 is not provided with the front film 11, so that part of the plurality of conductors 13 held by the back film 12, which is disposed where the front film 11 is not provided, is exposed to the outside. These exposed portions form conductor portions 13a.

In the longitudinal direction of the flat cable 10 from the conductor portions 13a, a pair of first cutouts 14 and a pair of second cutouts 15 are provided as substantially square-shaped securing portions in the vicinity of the exposed conductor portions 13a. These cutouts 14 and 15 penetrate the side end surfaces of the front and back films 11 and 12 of the flat cable 10. The first cutouts 14 engage the second protrusions 2d of the outwardly-bent lead block 1, while the second cutouts 15 engage the third protrusions 2e of the outwardly-bent lead block 1, in order to place the flat cable 10 on the cable holder 2b of the outwardly-bent lead block 1. The ends of the conductor portions 13a are retained by the L-shaped first protrusions 2c.

Here, the length of the flat cable 10 measured between the first cutouts 14 and the second cutouts 15 is made slightly longer than the length of the cable holder 2b measured between the second protrusions 2d and the third protrusions 2e. In other words, the distance L2 between the first cutouts 14 and the second cutouts 15 is made larger that the distance L1 between the second protrusions 2d and the third protrusions 2e. Therefore, when the first cutouts 14 of the flat cable 10 engage the second protrusions 2d, and the second cutouts 15 engage the third protrusions 2e, as mentioned above, a bent portion 16 of the flat cable 10 is formed between the second protrusions 2d and the third protrusions 2e, since the flat cable 10 is made slightly longer. In addition, a space (strain relief portion) 16a is formed between the cable holder 2b and the flat cable 10.

Here, the conductor portions 13a of the flat cable 10 oppose the connecting terminals 4 of the outwardly-bent lead block 1. The conductor portions 13a of the flat cable 10 are connected to their corresponding connecting terminals 4 of the outwardly-bent lead block 1, using the aforementioned ultrasonic welding machine, and, for example, a lead wire 26 is connected to each terminal 3 of the outwardly-bent lead block 1. This causes the flat cable 10 and the lead wires 26 to be integrally formed through the outwardly-bent lead block 1.

Figure 2:
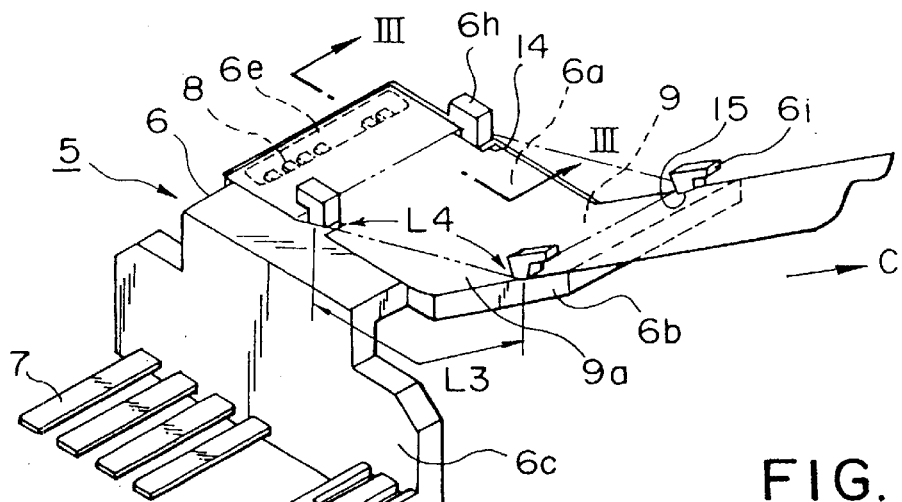
FIG. 2 is a perspective view showing the connecting portion of a flat cable and an inwardly-bent lead block in a second embodiment in accordance with the present invention.
Figure 3:
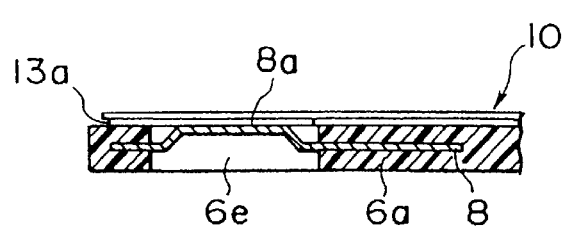
FIG. 3 is a sectional view taken along line III—III of FIG. 2

A description will now be given of a second embodiment of the present invention. FIG. 2 is a perspective view of the connecting portion of a flat cable and an inwardly-bent lead block in the second embodiment of the present invention. FIG. 3 is a sectional view taken along line III—III of FIG. 2. Corresponding parts to those of the conventional construction are given the same reference numerals. Referring to FIG. 2, the inwardly-bent lead block 5, serving as an external connecting part, includes a plurality of metal plates insert molded to a resinous molded portion 6, forming the body. The resinous molded part 6 comprises a substantially square-shaped holder 6a for placing thereon the flat cable 10, an inclined portion 6b extending from one end of the holder 6a in the longitudinal direction thereof, a terminal lead-out portion 6c extending downwardly from a side face of the holder 6a, and a lead wire lead-out portion 6d formed at right angles from a side end of the terminal lead-out portion 6c. Although in the present embodiment, the inclined portion 6b is formed as the deformed portion, the deformed portion may be a curved portion. In such a case, the deformed portion has a recess-shaped surface, with the flat cable 10 being disposed along the inner side of the recessed surface.

A substantially rectangular window 6e is provided at the other end of the holder 6a in the longitudinal direction thereof. In addition, a pair of L-shaped first protrusions 6h are formed as engaging portions so as to protrude upward from the sides of the upper surface of the holder 6a. Further, a pair of L-shaped second protrusions 6i are formed as engaging portions so as to protrude upward from the sides of the upper surface of the inclined portion 6b. A side surface of each second protrusion 6i is inclined from a line drawn perpendicular to the inclined portion 6b, serving as a base, in order to prevent disengagement of the flat cable 10 from the second protrusions 6i.

An end of each metal plate protrudes from the bottom of a side face of the terminal lead-out portion 6c of the resinous molded part 6, thereby forming terminals 7 and lead wire connecting terminals 6g. The other end of each metal plate is arranged in the window 6e of the resinous molded part 6, forming connecting terminals 8. The lead wire connecting terminals 6g are provided in the lead wire lead-out portion 6d, and are terminals for electrical connection to an air bag system control circuit.

As mentioned above, the portions of the metal plates which are exposed to the outside from the window 6e form the connecting terminals 8. In the present embodiment, six connecting terminals 8 are used to be integrally formed with the four terminals 7 and the two lead wire connecting terminals 6g, respectively.

As shown in FIG. 3, the connecting terminals 8 are exposed from the window 6e, with their center portions formed into protrusions 8a with a substantially trapezoidal shape. The upper surface of each protrusion 8a is formed at about the same height as the upper surface of the holder 6a. This allows the conductor portions 13a of the flat cable 10 held by the holder 6a to come into contact with and connect to the protrusions 8a of the connecting terminals 8, without undergoing deformation. Although, in FIG. 3, the protrusions 8a of the connecting terminals 8 are separated from the conductor portions 13a by a distance corresponding to the thickness of the lower PET side of the flat cable 10, the protrusions 8a may be raised further such that the protrusions 8a and holder 6a upper surface contact each other.

Similarly, protrusions (not shown), each with a substantially trapezoidal shape, are also formed in the connector terminals 4 of the outwardly-bent lead block 1.

A description will now be given of the structure for engaging the flat cable 10 to the inwardly-bent lead block 8 having the above-described construction.

The first protrusions 6h of the inwardly-bent lead block 8 engage their respective first cutouts 14 of the flat cable 10, while the second cutouts 15 engage their respective second protrusions 6i. In this case, the distance, L2 of FIG. 4, between each first cutout 14 and each second cutout 15 of the flat cable 10 is about the same as the distance, L3, between each first protrusion 6h and each second protrusion 6i of the inwardly-bent lead block 8. This allows the flat cable 10 to be bent along and placed along in contact with the holder 6a and the inclined portion 6b, which form the recess of the inwardly-bent lead block 8. The portion of the flat cable 10, which is placed along the holder 6a and the inclined portion 6b, forms a bent portion 9.

The straight-line distance between the first protrusions 6h and the second protrusions 6i (the shortest distance L4) is shorter than L3, since the second protrusions 6i are formed on the inclined portion 6b which is not on the same plane as the first protrusions 6h. The substantially rectangular space formed by a bent line drawn along distance L3 and a line drawn along the shortest distance L4 forms the space portion (or strain relief portion) 9a.

Figure 8:
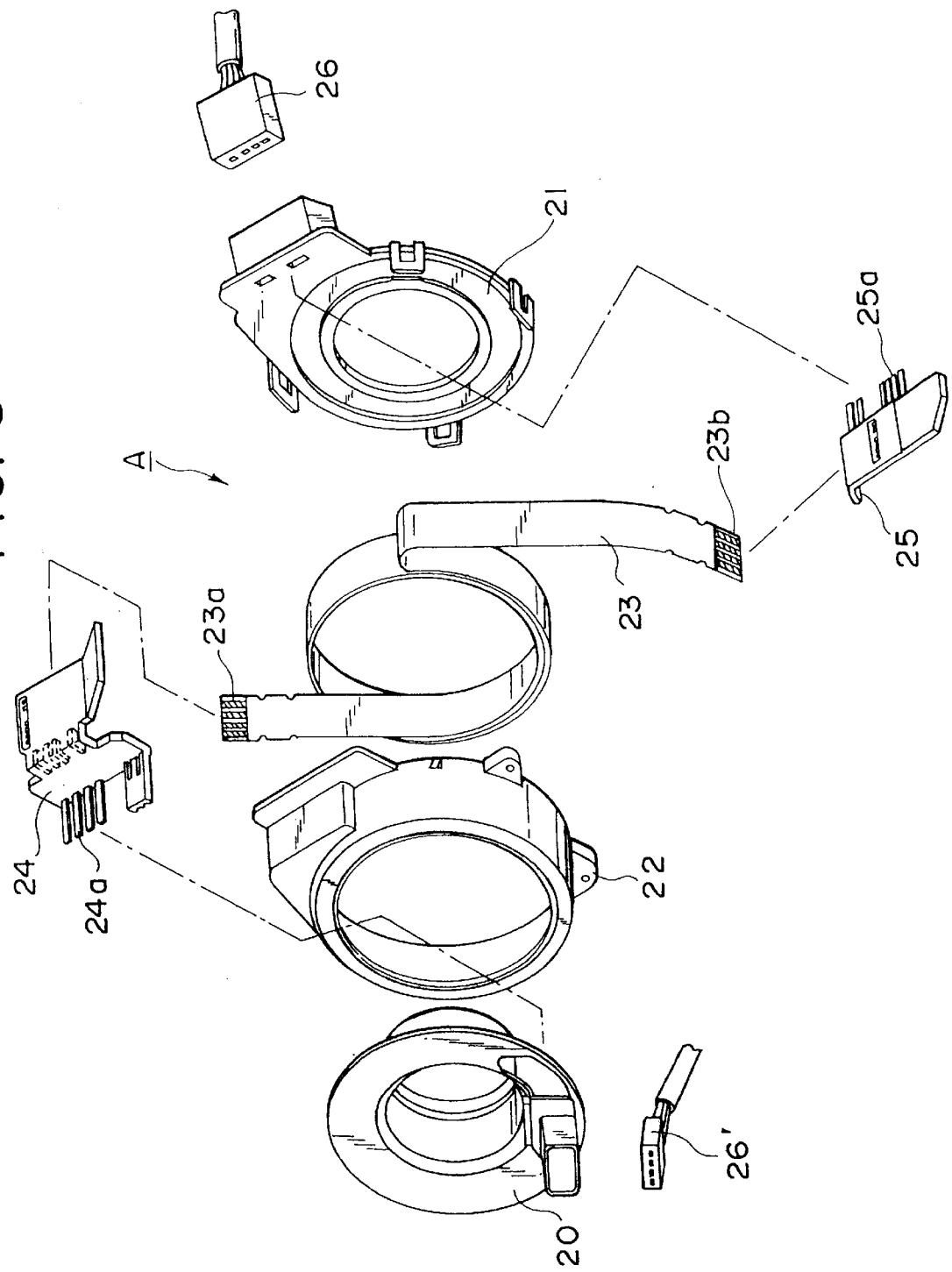
FIG. 8 is an exploded perspective view for illustrating a rotary connector.
Figure 9:
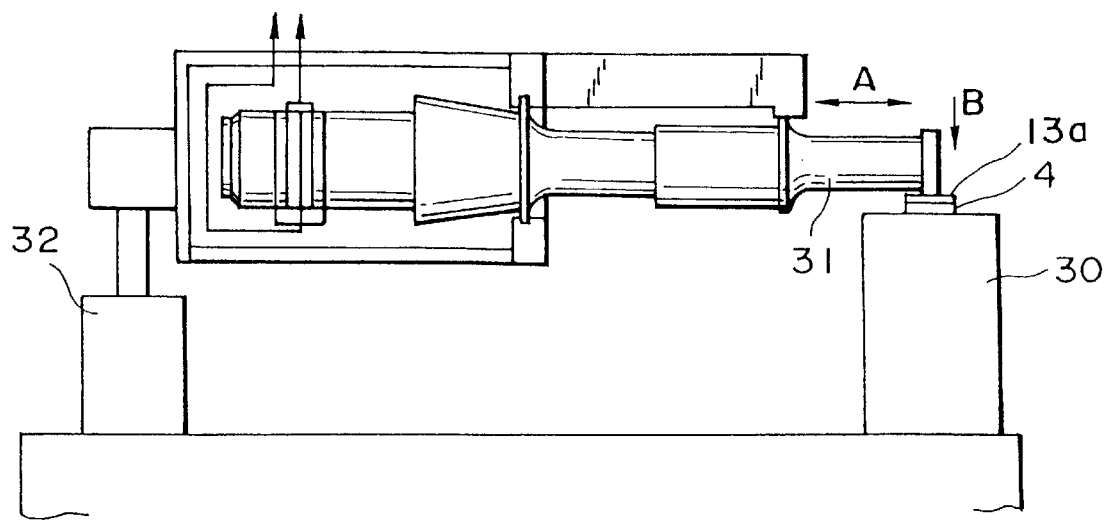
FIG. 9 is a schematic view of the construction of an ultrasonic welding machine.

Since the aforementioned rotary connector A is concentrically formed, the outwardly-bent and inwardly-bent lead blocks 1 and 5 of the above-described embodiments of the present invention are engaged and fixed to the outer ends of the upper and lower covers 20 and 21 of the concentrically-formed rotary connector A (see FIG. 8). Therefore, the outwardly-bent and inwardly-bent lead blocks 1 and 5 each have a recessed surface or a protruding surface in correspondence with the outside shape of the circular rotary connector A.

A description will now be given of the inspection of the amount of rotation of the rotary connector A with the above-described connecting structure of the flat cable and the terminals.

If the rotary connector is improperly incorporated, such that it can rotate, for example, only once in either the clockwise or counterclockwise direction, the rotary connector A is rotated to the terminal end, producing a rotational torque which is greater than a predetermined value, during inspection of the amount of rotation thereof with, for example, a torque meter. The condition resulting therefrom is described, with reference to the flat cable 10 connected to the outwardly-bent lead block 1 in the first embodiment of the present invention. The flat cable 10, rotated to the terminal end, is subjected to a pulling force in the direction of arrow B of FIG. 1, with a rotational torque which is greater than the predetermined value. The pulling force (in the direction of arrow B) deforms the second cutouts 15 of the flat cable 10 which engage the third protrusion 2e of the outwardly-bent lead block 1, and may cause them to disengage from the third protrusions 2e. Here, the space (strain relief portion) 16a formed by forming the bent portion 16 of the flat cable 10 acts to absorb the pulling force causing the deformation or the disengagement. When the space 16a is provided, the pulling force produced by rotation to the terminal end is virtually not exerted onto the first cutouts 14 engaging the second protrusions 2d as well as the ultrasonically welded portion of the conductor portions 13a and the connecting terminals 4.

The condition resulting from rotation to the terminal end will now be described with reference to the flat cable 10 connected to the inwardly-bent lead block 5 in the second embodiment of the present invention. Rotation of the flat cable 10 to the terminal end causes a pulling force to be applied thereto in the direction of arrow C of FIG. 2, with a rotational torque greater than a predetermined value. The pulling force (in the direction of arrow C) deforms the second cutouts 15 of the flat cable 10 which engage the second protrusions 6i of the inwardly-bent lead block 5, and may cause them to disengage the second protrusions 6i. Here, the space (or strain relief portion) 9a formed by forming the bent portion 9 of the flat cable 10 acts to absorb the pulling force causing the deformation and the disengagement. When the space 9a is provided, the pulling force produced by the rotation to the terminal end is virtually not exerted onto the cutouts 14 engaging the first protrusions 6h as well as the ultrasonically welded portion of the conductor portions 13a and the connecting terminals 4. Thus, the reliability of the connection is not reduced.

Although in the foregoing description, two pairs of protrusions (engaging portions) 2d and 2e were formed in the outwardly-bent lead block 1, and two pairs of protrusions (engaging portions) 6h and 6i were formed in the inwardly-bent lead block 5, only one pair of engaging portions may be formed in each of the outwardly-bent and inwardly-bent lead blocks 1 and 5. The pulling force can be absorbed in a construction provided with only one pair of protrusions (engaging portions), if a bent portion 16 and a strain relief portion 16a of the flat cable 10 are provided between the pair of protrusions (engaging portions) 2e, or a bent portion 9 and a strain relief portion 9a are provided between the pair of protrusions (engaging portions) 6i.

Although in the first and second embodiments of the present invention, connection of the connecting terminals 4 and 8 of the outwardly-bent and inwardly-bent lead blocks 1 and 5 to the flat cable 10 was described, the present invention can also be applied to the case where a cable is directly connected to a terminal of an external connecting part of, for example, other electrical devices.

According to the present invention, the conductor portions of the flat cable and the connecting terminals of the external connecting part are connected together, the engaging portions of the external connecting parts engage the securing portions of the flat cable, and a bent portion of the flat cable and a strain relief portion are provided between the connecting portion of the connecting terminals to the external connecting part and the engaging portions. Occasionally, a pulling force is exerted on the flat cable, causing the securing portions to get deformed. Even in such a case, the pulling force can be absorbed by the bent portion and the strain relief portion. For this reason, the pulling force is not applied to the connecting portion, so that the external connecting part and the flat cable can be connected together with high reliability at the connecting portion.

In addition, according to the present invention, the securing portions of the flat cable are formed into cutouts, and the engaging portions of the external connecting parts are formed into protrusions. The cutouts can be easily formed by pressing, such as by punching, and the protrusions can be easily formed by molding a resinous material. Thus, it is possible to provide a cheap product.

Further, according to the present invention, the connecting structure has a deformed surface formed in the body of the external connecting part along the longitudinal direction of the flat cable. Thus, the structure is formed to allow mounting of the body to electrical devices of any shape.

Still further, according to the present invention, at the portion of the body between the connecting terminals of the external connecting part and the engaging portions, a recess is formed along the longitudinal direction of the flat cable, and the flat cable is placed along the inner side of the recess. Therefore, a flat cable bent portion and a strain relief portion can be formed, without using any other structure.

The bent portion and the strain relief portion absorb the pulling force produced with a rotational torque greater than a predetermined value, so that these two portions are effective in allowing reliable connection of the external connecting part and the flat cable at the connecting portion.

Still further, according to the present invention, a flat cable bent portion and a strain relief portion are provided between the connecting terminals of the external connecting part and the engaging portions, so that even when the rotary cable is found to be assembled incorrectly, as a result of the rotational torque being larger than a predetermined value, during inspection of the range of rotation of the rotary connector, the bent portion and the strain relief portion absorb the pulling force. Thus, a pulling force, with a torque greater than the predetermined value, is not exerted onto the connecting portion of the conductor portions of the flat cable and the connecting terminals of the external connecting part. This reduces the possibility of peeling at the connecting portion, so that the reliability with which the flat cable and the external connecting part are connected at the connecting portion is not reduced. Consequently, rotary connectors, found to be assembled incorrectly, can be adjusted, such that its range of rotation fall within a proper range, and then shipped. As a result of this, there is no production loss caused by the throwing away of defective rotary connectors, thus making it unnecessary to produce extra products to allow for the number of defective products which may be produced.

What is claimed is:

1. A flat cable connecting structure, comprising:
   a flat cable including a film, a conductor portion having an exposed part of a conductor, a connecting portion disposed at said conductor portion and a securing portion separated from said connecting portion in the longitudinal direction of said film; and
   an external connecting part including a body, a connecting terminal, and an engaging portion with said connecting portion and said engaging portion being disposed on said body;
   wherein:
      said connecting terminal is connected to said connecting portion at said conductor portion, and said engaging portion is made to engage said securing portion, in order to connect said external connecting part to said flat cable;
      said flat cable when mounted on said connecting portion further including a bent portion disposed between said connecting portion and said engaging portion, the bent portion forming a space with said body, the space relieving strain; and
      an engaging is portion disposed near said connecting portion, and an engaging portion is disposed far from said connecting portion, and said bent portion of said flat cable and said strain relief portion are disposed between said engaging portions.

2. The flat cable connecting structure according to claim 1, wherein said securing portion is a cutout, and said engaging portion is a protrusion.

3. The flat cable connecting structure according to claim 1, wherein said body has a deformed surface along the longitudinal direction of said flat cable so as to be disposed between said connecting terminal of said external connecting part and said engager portion.

4. The flat cable connecting structure according to claim 3, wherein said deformed surface is formed into a recess in order to place said flat cable along the inner side of said recess, and wherein said bent portion corresponds to a portion of said flat cable placed along said recess, and said strain relief portion corresponds to a space in said recess.

5. The flat cable connecting structure according to claim 2, wherein said securing portion is a cutout, and said engaging portion is a protrusion.

6. The flat cable connecting structure according to claim 2, wherein said body has a deformed surface along the longitudinal direction of said flat cable so as to be disposed between both of said engaging portions.

7. The flat cable connecting structure according to claim 6, wherein said deformed surface is formed into a recess in order to place said flat cable along the inner side of said recess, and wherein said bent portion corresponds to a portion of said flat cable placed along said recess, and said strain relief portion corresponds to a space in said recess.

8. A rotary connector, comprising:
   a pair of housings which are linked together so as to be rotatable relative to each other;
   a flat cable accommodated in a space between said housings, both ends of which are secured to said pair of housings; and
   an external connecting part connected to at least one end of said flat cable,
   wherein:
      said flat cable includes a film, a connecting portion disposed at a conductor portion having an exposed part of a conductor, and a securing portion separated from said connecting portion in the longitudinal direction of said film;
      said external connecting part includes a body, a connecting terminal, and an engaging portion, with said connecting portion and said engager being disposed on said body;
      said connecting terminal is connected to said connecting portion at said conductor portion, and said engaging portion is made to engage said securing portion, in order to connect said external connecting part to said flat cable;
      said flat cable further includes a bent portion disposed between said connecting portion and said engaging portion, the bent portion forming a space with said body, the space relieving strain; and
      said external connecting part is fixed to said housing in order lead out electrically of said housing.

9. The rotary connector according to claim 8, wherein said engager includes an engaging portion disposed near said connecting portion, and an engaging portion disposed far from said connecting portion, and wherein said bent portion of said flat cable and said strain relief portion are disposed between said engaging portions.

* * * * *

UNITED STATES PATENT AND TRADEMARK OFFICE
CERTIFICATE OF CORRECTION

PATENT NO. : 5,951,322
DATED : September 14, 1999
INVENTOR(S) : Kenichiro Nishikigi It is certified that error appears in the above-identified patent and that said Letters Patent is hereby corrected as shown below:

<u>In the Claims</u>
Col. 11, line 66,
In claim 1, line 22, change "is portion" to --portion is--.
Col. 12, line 11,
In claim 3, line 5, change "engager" to --engaging--.
Col. 12, line 47,
In claim 8, line 17, change "engager" to --engaging portion--.
Col. 12, line 59,
In claim 8, line 29, after "order" insert --to--.
Col. 12, line 61,
In claim 9, line 2, change "engager" to --engaging portion--.

Signed and Sealed this

Sixth Day of June, 2000

Attest:

Q. TODD DICKINSON

*Attesting Officer*  *Director of Patents and Trademarks*